(12) United States Patent
Belehradek

(10) Patent No.: US 6,366,053 B1
(45) Date of Patent: Apr. 2, 2002

(54) DC PUMP CONTROL SYSTEM

(75) Inventor: Anton Belehradek, Downers Grove, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 0 days.

(21) Appl. No.: 09/516,569

(22) Filed: Mar. 1, 2000

(51) Int. Cl.[7] .............................................. H01M 10/46
(52) U.S. Cl. ..................................................... 320/128
(58) Field of Search ................................ 320/103, 104, 320/127, 128, 134, 135, 139, 141

(56) References Cited

U.S. PATENT DOCUMENTS

| | | | |
|---|---|---|---|
| 5,175,484 A | * | 12/1992 | Witehira et al. |
| 5,508,905 A | | 4/1996 | Reichard |
| 5,569,998 A | * | 10/1996 | Cowan |
| 5,712,795 A | * | 1/1998 | Layman et al. |
| 5,742,147 A | * | 4/1998 | Molina et al. |

OTHER PUBLICATIONS

Zoller Pump Co., "The Aquanot Series," Models 580 & 585, 1998 (8 pages).

* cited by examiner

*Primary Examiner*—Edward H. Tso
(74) *Attorney, Agent, or Firm*—Rockey, Milnamow & Katz, Ltd.

(57) ABSTRACT

A processor controlled DC pump system charges back-up batteries using utility supplied AC power. In the absence of AC the batteries energize a DC load. When AC is restored, the processor regulates total output current to charge the batteries and energize the load without exceeding the maximum allowable total output current.

26 Claims, 4 Drawing Sheets

DC PUMP CONTROL SYSTEM

FIELD OF THE INVENTION

The invention pertains to uninterruptable power supplies. More particularly, the invention pertains to such supplies that can be used to charge a battery alone or in combination with energizing a DC pump motor.

BACKGROUND OF THE INVENTION

Uninterruptable power supplies to provide backup in the absence of utility power are known. One such supply is disclosed and claimed in Reichard U.S. Pat. No. 5,508,905, entitled Low Distortion Variable Output Power Supply and assigned to the assignee hereof. The system of Reichard charges a DC battery or batteries, and, in normal operation provides utility supplied AC to a load such as an AC sump pump. In the absence of utility AC Reichard's system generates an AC output which can be used to energize that pump.

Reichard's system is AC-to-AC. A market exists for DC sump pumps which are installed to backup a primary AC pump. DC pumps are often small enough that they can be installed into a sump along with a physically larger AC pump. When so installed they provide an additional degree of redundancy.

AC-to-DC backup supplies must address previously unmet challenges. Such supplies store energy in wet cells, for example deep discharge marine batteries. Such batteries must be kept fully charged for long time intervals between utility power failures. When a utility failure occurs, the battery or batteries must be able to immediately start to supply energy to drive the pump.

One known approach to battery charging is to periodically charge the battery or batteries for a predetermined period of time irrespective of their condition. While easy to implement, this approach fails to adequately address fully charged batteries and substantially discharged batteries.

Over-charging is potentially dangerous. Under-charging may result in a battery having inadequate energy in an emergency.

In addition, where a pump is demanding current and the battery or batteries need to be charged, output voltage from the supply can be substantially reduced. Conservation of energy principles require that in such instances, output current from the supply increase significantly and as a result may exceed the ratings of the supply.

Thus there continues to be a need for an uninterruptable power supply for driving DC pumps. Preferably such a supply could not only maintain the battery or batteries in a fully charged condition, without over-charging the battery or batteries, but it will also limit output current so as to protect the integrity of the respective supply. Finally, it would be preferable if such supplies were price competitive with existing supplies.

SUMMARY OF THE INVENTION

A high current capacity direct current supply incorporates a programmed processor and executable instructions to monitor changing output load conditions as well as changing utility line input conditions. In one embodiment, energy can be stored in rechargeable, deep discharge marine batteries.

Power conversion in one embodiment can be implemented by one or more transformers in combination with a switching regulator. A variable control signal can be used to vary regulator output. In another embodiment, a transformer can be combined with a linear regulator.

In another aspect, a total output current sensor, coupled to the processor, can be used to monitor output power and to limit maximum output current to a predetermined value. A separate load current sensor, also coupled to the processor, can be used to monitor the load.

Executable instructions, in response to detecting an over current condition, adjust the power conversion circuitry to limit that current. Other instructions maintain charge on the battery or batteries and reduce current thereto so as to avoid an overcharged condition which can damage the battery or batteries.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
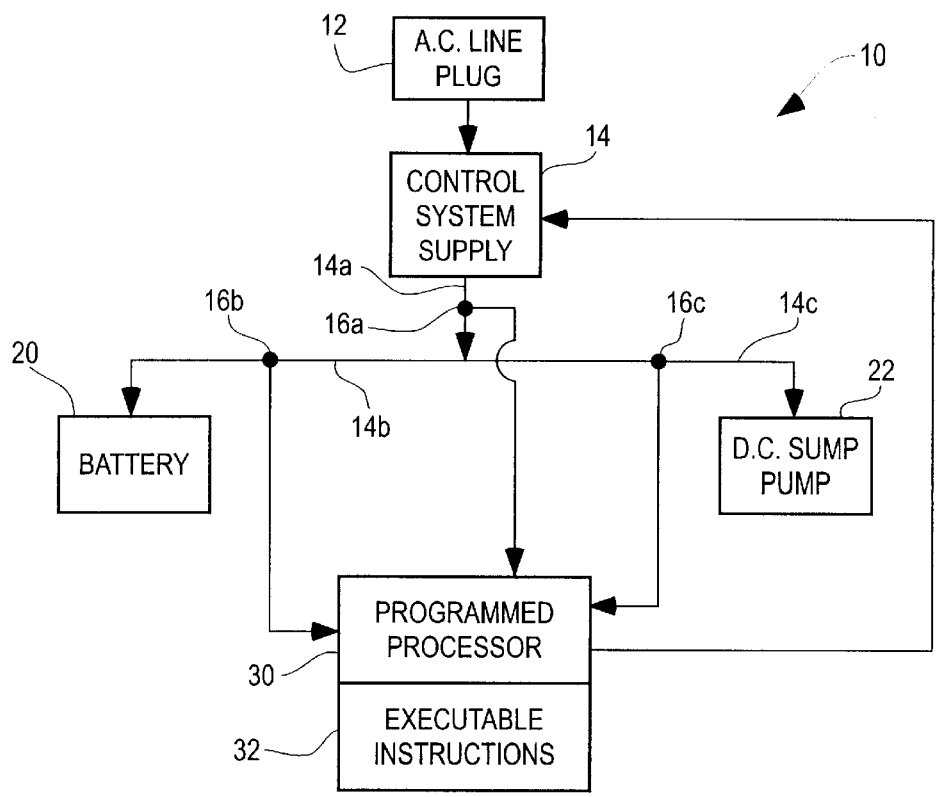
FIG. 1 is an over-all block diagram of a DC pump control system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A system 10 includes an AC line plug 12 which can be coupled to an AC utility receptacle. The receptacle functions as a source of utility AC power under normal operating conditions. A control system power supply 14 is coupled to plug 12 and receives utility AC power therethrough.

The supply 14 converts AC input energy to DC output energy at line 14a. This energy can be used for two different purposes as discussed below. Output line 14a from supply 14 includes a total output current sensor 16a.

A rechargeable storage battery, such as a deep discharge marine battery, 20 and a DC load, such as a DC pump, 22 are coupled in parallel via lines 14b,c across the output line 14a. Additional current sensors 16b,c can be incorporated so as to monitor battery and load currents.

System 10 includes programmed processor 30 and pre-stored executable instructions 32. Processor 30 can monitor currents from sensors 16a,b,c. It can also control the operation of supply 14 via control line 30a.

Figure 2:
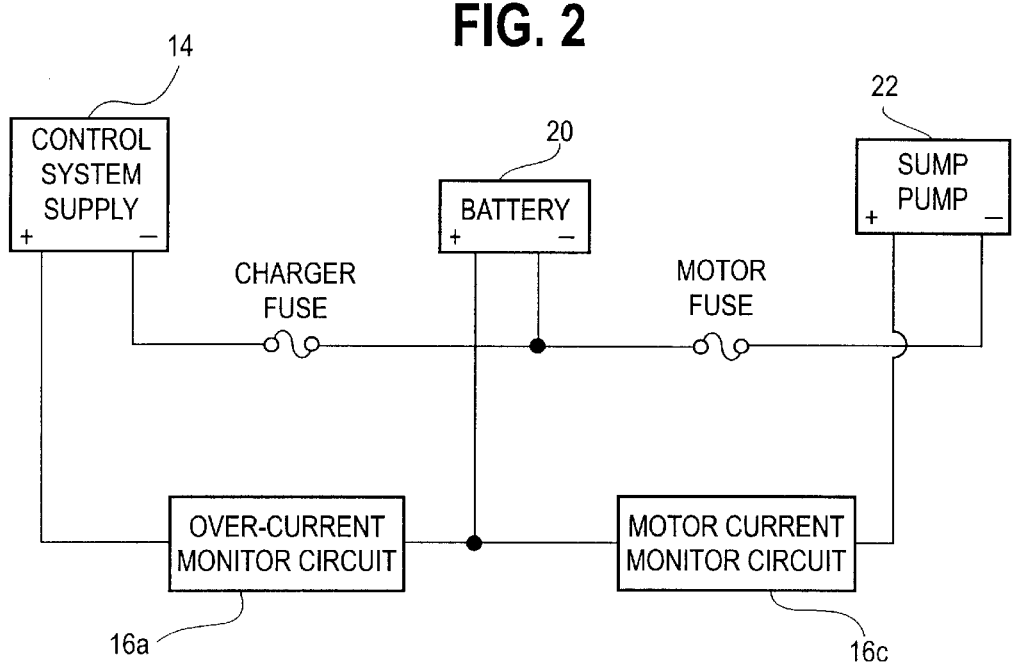
FIG. 2 is an interconnect diagram illustrating additional details of the system of FIG. 1.

FIG. 2 illustrates one way in which supply 14 can be coupled to battery 20 and pump 22. In another configuration, sensor 16b can be incorporated in series with battery 20.

Figure 3:
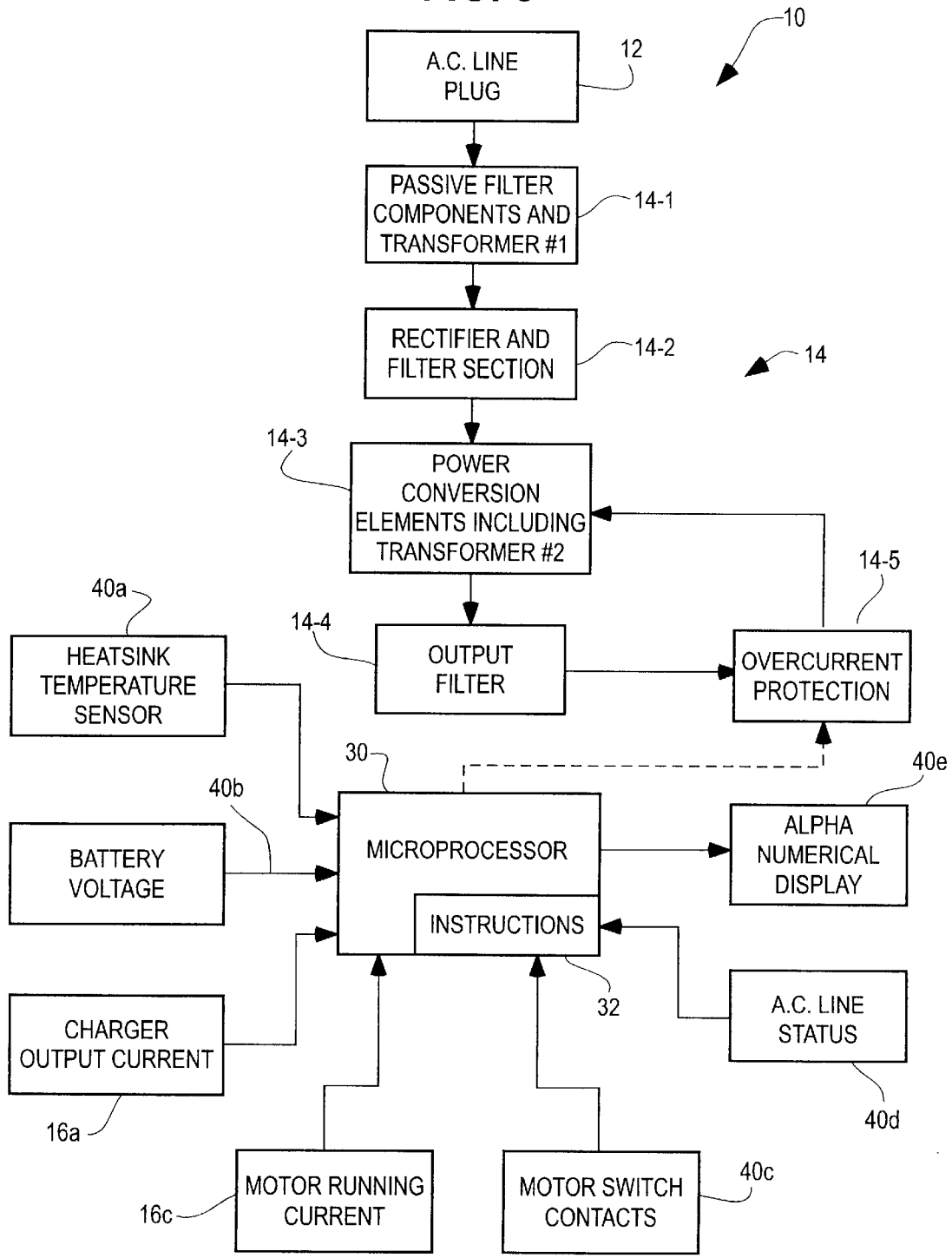
FIG. 3 is a more detailed block diagram of the control system of FIG. 1.

FIG. 3 illustrates system 10 in greater detail. Supply 14 includes an input filter and transformer section 14-1. A full bridge rectifier and filter section 14-2 is coupled thereto. Solid state switching elements and a second transformer configured as a switching regulator 14-3 are coupled thereto. Supply 14 also includes an output filter section 14-4 and overcurrent protection circuitry 14-5.

In addition to the sensors noted above, processor 30 can receive inputs from a thermal sensor 40a, a battery voltage sensing input 40b, motor switch contacts 40c, and an AC line status input 40d. Human discenable feedback can be provided via an alphanumeric display 40e which receives inputs from processor 30.

In a preferred embodiment, utility power is converted down by means of a step-down (buck) transformer configured in the full-bridge topology, (14-3.) Typical regulated power supplies are generally intended to supply an output current at some voltage into some load, whether it be resistive or inductive. The fact that the power supply is regulated infers that the output voltage is constant over some variable input voltage range and changing load condition.

This design utilizes a full-bridge/transformer combination for the power conversion process. An output LC filter (inductor-capacitor) filter further reduces the output ripple voltage. As is known:

Power In=Power Out+Losses.

The input power to the power supply is equivalent to the output power of the supply PLUS any related efficiency losses (ie, switching losses, transformer core losses, etc.). As the output current increases due to load demands the input current too increases (provided the input voltage is constant or falling). By monitoring the current on the primary of the transformer winding one could get a fair assessment of the magnitude of the current on the secondary of the transformer, provided the output voltage of the supply is always constant.

A constant output voltage is not the case with the system 10. Though the power supply 14 is a regulated power supply, the load to which the power supply is coupled is extremely capacitive. Capacitors do not permit fast changes or fluctuations in voltage across their terminals. The noted load is the deep-cycle marine battery 20 which supplies current to the sump pump 22 as needed.

In one operating scenario, the AC line voltage has been lost. Since there is no available utility power, the DC sump pump 22 must run entirely off the reserve energy provided by the battery 20. Assuming that the utility power has been out for some lengthy duration and that the sump pump has been utilized extensively during this time, it is very likely that the voltage of the battery 20 will have fallen from some initial value (fully charged condition) to some lower value.

When the AC line is restored, the power supply 14 will now be expected to provide power to charge the battery 20 and run the sump pump 22 if it is still called for. This is an extremely stressful condition. Since the battery voltage has fallen to some unknown value, the power supply output voltage (which is in parallel with the battery) is clamped to this voltage. Since:

$(V_{in} * I_{in}) = (V_{out} * I_{out}) + losses$ then $I_{out} = ((V_{in} * I_{in}) - losses)/V_{out}$ Hence, if constant input power is maintained (and constant losses) and the voltage on the output of the supply suddenly decreases (i.e., the application of the used deep cycle battery), then the output current will increase to balance the power equation. This again assumes monitoring only the transformer primary current (which is generally the case in most current-mode control designs). This might not be a problem if the output components of supply 14 are rated with large current capacities. However, high current ratings are directly proportional to higher component costs.

System 10 incorporates a separate current monitoring element 14-5. This element is intended to limit the maximum output current to some specified level regardless of changing output voltage levels. As the output current rises to that maximum level a signal is sent to a PWM controller in element 14-3 which interrupts the gating cycle. This decreases the current to a safer value.

Below is a list of representative scenarios which may occur during system operation:

Scenario #1
   If:
      (AC line is valid) and
      (sump Pm is called for) and
      (motor current>=motor running current)
   Then:
      (system is operating properly).

Scenario #2
   If:
      (AC line is valid) and
      (sump pump is called for) and
      (Motor current<motor running current)
   Then:
      (motor fuse may be blown) or
      (motor winding may have opened).

Scenario #3
   If:
      (AC line is valid) and
      (sump pump is called for) and
      (motor current>=motor running current) and
      (over-current monitor<minimum current threshold)
   Then
      (charger fuse is blown open).

Scenario #4
   If:
      (AC line is invalid) and
      (sump pump is called for) and
      (motor current>=motor running current)
   Then:
      (system is running properly).

Scenario #5
   If:
      (AC line is invalid) and
      (sump pump is called for) and
      (motor current <motor running current)
   Then:
      (motor fuse may be blown) or
      (motor winding may have opened).

The system 10 further includes circuitry and software to sound an alarm indicative of motor failure using a third motor lead. The system 10 can also incorporate a secondary switch which would act as a high water alarm and a redundant motor run switch. The system 10 can also incorporate a display, such as one implementing using light emitting diodes which would allow the user to check in system operation.

Figure 4:
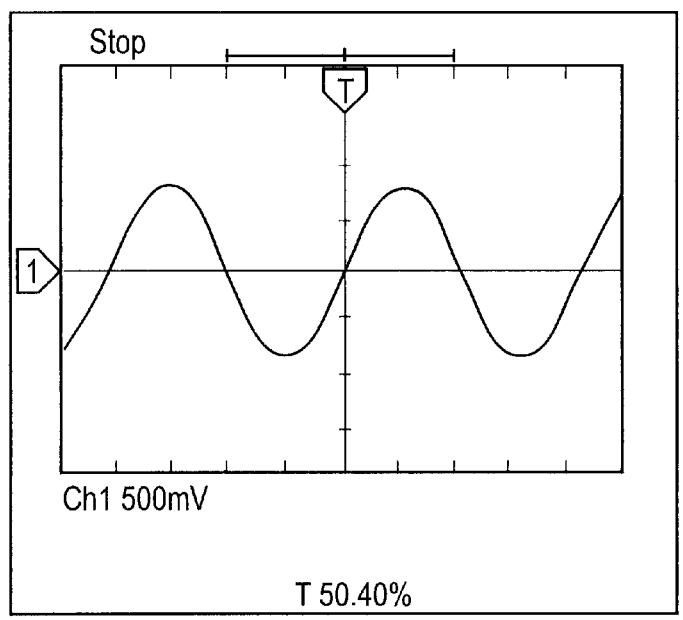
FIG. 4 is a graph illustrating AC line voltage when the system of FIG. 3 is in a stand-by mode.

FIG. 4 shows the AC line voltage while the system 10 is in STANDBY mode. The RMS voltage is approximately 120

VAC. No distortion to the sinusoidal waveform is observable during this mode of operation.

Figure 5:
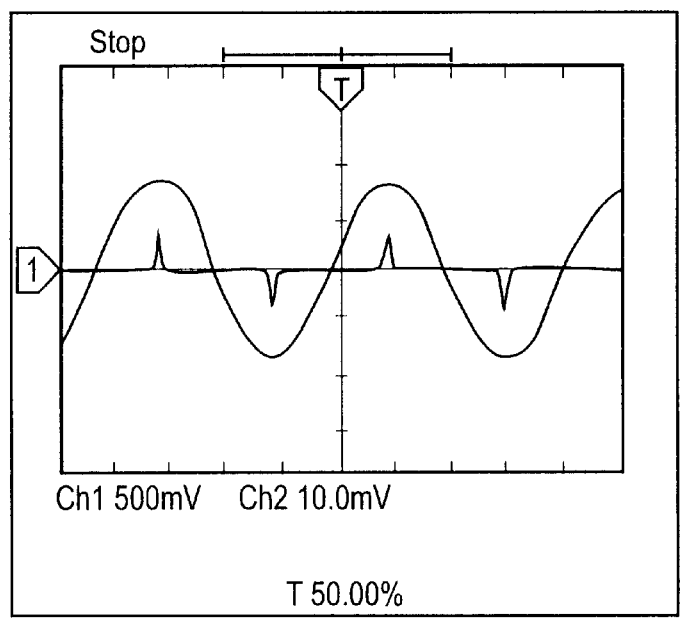
FIG. 5 is a graph illustrating AC line voltage superimposed with an input current waveform.

FIG. 5 shows the AC line voltage waveform superimposed on the input current waveform. During STANDBY mode, the system 10 draws very little current from the utility. The input current is drawn in pulses through the bridge rectifier and into the input capacitor and power supply.

Figure 6:
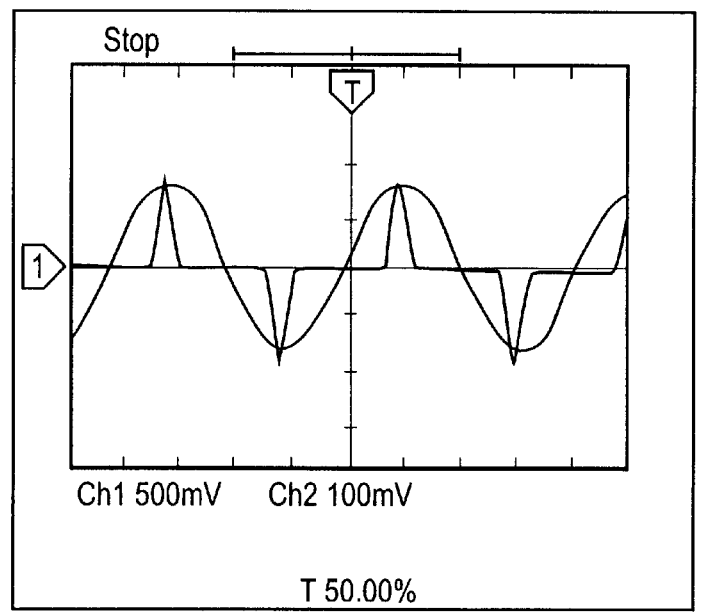
FIG. 6 illustrates AC line voltage and an input current waveform while the system is energizing a pump motor; and, FIG. 7 is a graph illustrating switching characteristics of the power transformer during pump operation.

FIG. 6 shows the AC line voltage along with input current waveform while the DC pump controller is operating the pump motor. Notice the change in input current amplitude between the waveforms in FIGS. 2 and 3. The AC line voltage waveform remains fairly distortionless during this mode of operation which allows for very little harmonic distortion to the utility line. This can be attributed to the input filter (see block diagram) in the power supply.

Figure 7:
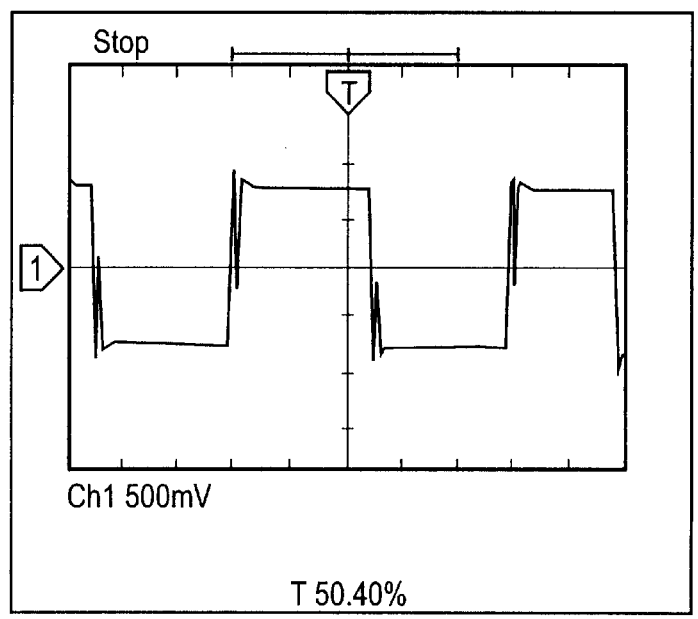

FIG. 7 is a waveform illustrating the switching characteristics of the power transformer during pump operation. Notice that the switching frequency of the unit is 100 kHz. This allows for very efficient power conversion and a reduction in component size.

During an output over-current event, this switching waveform would disappear. It would appear as a horizontal line on the graph which would imply that no switching activity was occurring. This lack of operation would cause the output of the power supply to suddenly drop output voltage and consequently output current. After a minimum reset time determined by the PWM gating controller, the switching would resume. (Similar to the graph illustrated in FIG. 7.) This would allow the output voltage to rise along with the output current.

If the output current rises beyond the maximum allowable threshold, the switching activity would again be terminated and the cycle would repeat. This is known as foldback current limiting.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A control system comprising:
    an input port for a first type of electrical energy having a periodically varying parameter;
    a conversion circuit, coupled to the port for conversion of the first type to a second type of electrical energy with a non-periodically varying corresponding, first parameter;
    an output port coupled to the circuit;
    a programmed control unit, coupled to the circuit which includes executable instructions for monitoring the first and second types of electrical energy and for adjusting the circuit so as to maintain at least one different parameter of a second type below a predetermined maximum value.

2. A system as in claim 1 wherein the first parameter comprises a voltage and the different parameter comprises an output current wherein the control unit, in response to a demand for output current which exceeds a predetermined maximum value, adjusts the conversion circuit to limit output current to that maximum.

3. A system as in claim 2 wherein the conversion circuit includes a switching power supply and wherein the control unit adjusts a switching parameter thereof to limit the output current.

4. A system as in claim 1 which includes a battery coupled to the output port and wherein the control unit includes instructions for monitoring battery voltage and for adjusting the conversion circuit to maintain a predetermined level of energy stored by the battery.

5. A system as in claim 4 which includes a load to be intermittently energized by at least one of the battery and the conversion circuit.

6. A system as in claim 5 wherein the different parameter corresponds to an output current and the control unit includes instructions for responding to an output over current condition, due to current demand from at least the battery, by adjusting the conversion circuit to limit the output current to the maximum value.

7. A system as in claim 6 wherein the instructions also respond to a simultaneous demand for current to drive the load.

8. A system as in claim 1 which includes a battery coupled to the output port.

9. A system as in claim 8 which includes a sensor of output current from the output port.

10. A system as in claim 9 which includes a non-battery, load current sensor.

11. A pump system couplable to a back-up battery comprising:
    a pump having a DC drive motor;
    a control element;
    an AC/DC power conversion circuit coupled to the control element; and,
    a sensor of current output from the conversion circuit wherein the output current charges the battery only until it exhibits a predetermined charging condition and the output current drives the motor of the pump and charges the battery up to a not-to-be exceeded predetermined value.

12. A system as in claim 11 wherein the control element alters a parameter of the conversion circuit in response to sensing an output current that exceeds the predetermined value.

13. A system as in claim 12 wherein the conversion circuit includes at least one transformer.

14. A system as in claim 13 wherein the conversion circuit includes at least one switched transformer.

15. A system as in claim 13 which includes a switched output voltage regulator.

16. A system as in claim 12 wherein the control unit includes a programmed processor and executable instructions for limiting output current.

17. A system as in claim 16 wherein the instructions alter a switching parameter of the conversion circuit.

18. A pump system for use with a DC-type pump comprising:
    an input port for a first type of electrical energy having a periodically varying parameter;
    a conversion circuit, coupled to the port for conversion of the first type to a second type of electrical energy with a non-periodically varying corresponding, first parameter;
    an output port coupled to the circuit wherein the output port can be coupled to the pump;
    a programmed control unit, coupled to the circuit which includes executable instructions for monitoring the first and second types of electrical energy and for adjusting the circuit so as to maintain at least one different parameter of a second type below a predetermined maximum value.

19. A system as in claim 18 wherein the first parameter comprises a voltage and the different parameter comprises an output current wherein the control unit, in response to a demand for output current which exceeds a predetermined maximum value, adjusts the conversion circuit to limit output current to that maximum.

20. A system as in claim 19 wherein the conversion circuit includes a switching power supply and wherein the control unit adjusts a switching parameter thereof to limit the output current.

21. A system as in claim 18 which includes a battery coupled to the output port and wherein the control unit includes instructions for monitoring battery voltage and for adjusting the conversion circuit to maintain a predetermined level of energy stored by the battery.

22. A system as in claim 21 which includes a DC-type pump to be intermittently energized by at least one of the battery and the conversion circuit.

23. A system as in claim 22 wherein the different parameter corresponds to an output current and the control unit includes instructions for responding to an output over current condition, due to current demand from at least the battery, by adjusting the conversion circuit to limit the output current to the maximum value.

24. A system as in claim 23 wherein the instructions also respond to a simultaneous demand for current to drive the pump.

25. A system as in claim 22 which includes a sensor of output current from the output port.

26. A system as in claim 25 which includes a non-battery, load current sensor.

* * * * *